(12) United States Patent
Mott et al.

(10) Patent No.: US 9,356,377 B2
(45) Date of Patent: *May 31, 2016

(54) ELECTRICALLY CONDUCTING TERMINAL

(71) Applicant: Lear Corporation, Southfield, MI (US)

(72) Inventors: Allen Leo Mott, Livonia, MI (US);
Slobodan Pavlovic, Novi, MI (US);
Tulasi Sadras-Ravindra, Canton, MI
(US); Michael Glick, Farmington Hills,
MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/226,267

(22) Filed: Mar. 26, 2014

(65) Prior Publication Data

US 2014/0206243 A1 Jul. 24, 2014

Related U.S. Application Data

(63) Continuation of application No. 13/214,376, filed on Aug. 22, 2011, now Pat. No. 8,840,436, which is a continuation-in-part of application No. 13/101,592, filed on May 5, 2011, now Pat. No. 8,876,562.

(51) Int. Cl.
*H01R 13/187* (2006.01)
*H01R 13/11* (2006.01)
*H01R 13/42* (2006.01)

(52) U.S. Cl.
CPC ............ *H01R 13/187* (2013.01); *H01R 13/111* (2013.01); *H01R 13/42* (2013.01)

(58) Field of Classification Search
CPC ..... H01R 13/111; H01R 13/42; H01R 13/187
USPC .................................. 439/851, 748, 842, 843
See application file for complete search history.

(56) References Cited

U.S. PATENT DOCUMENTS 2,912,668 A 11/1959 Eddy
3,059,208 A 10/1962 Concelman
(Continued)

FOREIGN PATENT DOCUMENTS

CH 151479 3/1932
CN 102005679 A 4/2011
(Continued)

OTHER PUBLICATIONS

"SAE Electric Vehicle and Plug in Hybrid Electric Vehicle Conductive Charge Coupler", Surface Vehicle Recommended Practice, J1772 Jan. 2010, SAE International, Issued Oct. 1996, Revised Jan. 2010.
(Continued)

*Primary Examiner* — Neil Abrams
*Assistant Examiner* — Travis Chambers
(74) *Attorney, Agent, or Firm* — Brooks Kushman P.C.

(57) ABSTRACT

An electrically conducting terminal having capabilities to facilitate electrically connecting to one or more connectors is disclosed. The electrically conducting terminal may include a recessed end to receive a connector. The recessed end may include a resilient element, such as but not limited to a female contact, to facilitate electrical conductivity between the connector and the terminal. The electrically conducting terminal may include an end cap, end piece, or other feature to facilitate retaining the resilient element within the recessed end.

18 Claims, 6 Drawing Sheets

(56) References Cited

U.S. PATENT DOCUMENTS

| | | | |
|---|---|---|---|
| 3,161,451 A | 12/1964 | Neidecker | |
| 3,784,965 A | 1/1974 | Murphy | |
| 4,002,400 A | 1/1977 | Evans | |
| 4,258,970 A * | 3/1981 | Bourdon et al. | 439/149 |
| 4,401,359 A | 8/1983 | Frelk | |
| 4,508,413 A | 4/1985 | Bailey | |
| 4,572,606 A | 2/1986 | Neumann et al. | |
| 4,679,875 A | 7/1987 | Ramsey | |
| 4,714,441 A * | 12/1987 | Corman | 439/842 |
| 4,734,063 A | 3/1988 | Koch et al. | |
| 4,734,064 A | 3/1988 | Knapp et al. | |
| 4,826,144 A | 5/1989 | Balsells | |
| 4,934,967 A | 6/1990 | Marks et al. | |
| 5,106,328 A | 4/1992 | Prochaska et al. | |
| 5,139,276 A | 8/1992 | Balsells | |
| 5,151,040 A | 9/1992 | Tanaka | |
| 5,203,813 A | 4/1993 | Fitzsimmons et al. | |
| 5,358,224 A | 10/1994 | Balsells | |
| 5,376,012 A | 12/1994 | Clark | |
| 5,449,304 A | 9/1995 | Huss, Jr. et al. | |
| 5,474,309 A | 12/1995 | Balsells | |
| 5,474,479 A | 12/1995 | Bennett et al. | |
| 5,482,476 A * | 1/1996 | Watanabe et al. | 439/555 |
| 5,588,852 A | 12/1996 | Puerner | |
| 5,591,039 A | 1/1997 | Matthews | |
| 5,599,027 A | 2/1997 | Balsells | |
| 5,658,175 A | 8/1997 | Muzslay | |
| 5,667,413 A | 9/1997 | Trafton | |
| 5,676,571 A | 10/1997 | Matthews | |
| 5,730,628 A | 3/1998 | Hawkins | |
| 5,735,716 A | 4/1998 | Bilezikjian | |
| 5,816,643 A | 10/1998 | Itou et al. | |
| 5,921,803 A | 7/1999 | Mori | |
| 5,938,487 A | 8/1999 | Henry et al. | |
| 6,039,614 A | 3/2000 | Ramari | |
| 6,042,432 A | 3/2000 | Hashizawa et al. | |
| 6,062,919 A | 5/2000 | Trafton | |
| 6,102,746 A | 8/2000 | Nania et al. | |
| 6,102,751 A | 8/2000 | Becker | |
| 6,186,841 B1 | 2/2001 | Jacobsson | |
| 6,190,215 B1 | 2/2001 | Pendleton et al. | |
| 6,250,974 B1 | 6/2001 | Kerek | |
| 6,254,439 B1 * | 7/2001 | Endo et al. | 439/843 |
| 6,264,508 B1 | 7/2001 | Lehmann | |
| 6,273,766 B1 | 8/2001 | Zennamo, Jr. et al. | |
| 6,296,970 B1 | 10/2001 | Killebrew et al. | |
| 6,464,546 B2 | 10/2002 | LaCoy | |
| 6,475,039 B1 | 11/2002 | Despouys | |
| 6,482,049 B1 | 11/2002 | Swearingen | |
| 6,602,090 B2 | 8/2003 | Kato | |
| 6,752,668 B2 | 6/2004 | Koch, Jr. | |
| 6,811,453 B2 | 11/2004 | Williams | |
| 6,835,084 B2 | 12/2004 | Poon et al. | |
| 6,837,756 B2 | 1/2005 | Swearingen et al. | |
| 6,848,922 B2 | 2/2005 | Coughlan et al. | |
| 6,899,571 B1 | 5/2005 | Koch et al. | |
| 6,966,802 B2 | 11/2005 | Hielscher et al. | |
| 7,048,596 B2 | 5/2006 | Swearingen et al. | |
| 7,074,096 B2 | 7/2006 | Copper et al. | |
| 7,191,518 B2 | 3/2007 | Beloritsky et al. | |
| 7,393,252 B2 | 7/2008 | Ribeau et al. | |
| 7,828,609 B2 | 11/2010 | Li et al. | |
| 7,845,992 B2 | 12/2010 | Glick et al. | |
| 7,892,050 B2 | 2/2011 | Pavlovic et al. | |
| 7,909,236 B2 | 3/2011 | Erdie | |
| 8,282,429 B2 | 10/2012 | Glick et al. | |
| 8,414,339 B1 | 4/2013 | Glick et al. | |
| 8,425,253 B2 | 4/2013 | Malloy et al. | |
| 8,430,698 B2 * | 4/2013 | Stewart et al. | 439/843 |
| 8,840,436 B2 * | 9/2014 | Mott | H01R 13/111 439/843 |
| 2002/0055305 A1 | 5/2002 | Williams | |
| 2002/0122690 A1 | 9/2002 | Poon et al. | |
| 2003/0040228 A1 | 2/2003 | Finzer et al. | |
| 2003/0077950 A1 | 4/2003 | Swearingen et al. | |
| 2004/0245686 A1 | 12/2004 | Balsells | |
| 2005/0242910 A1 | 11/2005 | Balsells | |
| 2007/0190868 A1 | 8/2007 | De Cloet et al. | |
| 2008/0246231 A1 | 10/2008 | Sjostedt et al. | |
| 2008/0254670 A1 | 10/2008 | Balsells et al. | |
| 2008/0255631 A1 | 10/2008 | Sjostedt et al. | |
| 2009/0048638 A1 | 2/2009 | Rey et al. | |
| 2009/0258519 A1 | 10/2009 | Dilmaghanian et al. | |
| 2009/0298356 A1 | 12/2009 | Li et al. | |
| 2010/0029127 A1 | 2/2010 | Sjostedt | |
| 2010/0029145 A1 | 2/2010 | Balsells et al. | |
| 2010/0191299 A1 | 7/2010 | Ayzenberg | |
| 2010/0279558 A1 | 11/2010 | Leon et al. | |
| 2010/0311266 A1 | 12/2010 | Dilmaghanian et al. | |
| 2011/0034053 A1 | 2/2011 | Matsumoto et al. | |
| 2011/0171850 A1 | 7/2011 | Brown, II | |
| 2012/0000329 A1 | 1/2012 | Glick | |
| 2012/0003880 A1 | 1/2012 | Glick et al. | |
| 2012/0003882 A1 | 1/2012 | Stewart et al. | |
| 2012/0003883 A1 | 1/2012 | Pavlovic et al. | |
| 2012/0282797 A1 | 11/2012 | Mott et al. | |
| 2012/0282823 A1 | 11/2012 | Glick et al. | |
| 2012/0322322 A1 | 12/2012 | Stewart et al. | |
| 2013/0017739 A1 | 1/2013 | Glick et al. | |
| 2013/0052854 A1 | 2/2013 | Mott et al. | |
| 2013/0109221 A1 | 5/2013 | Glick et al. | |
| 2013/0109237 A1 | 5/2013 | Glick et al. | |
| 2013/0337702 A1 | 12/2013 | Pavlovic et al. | |

FOREIGN PATENT DOCUMENTS

| | | |
|---|---|---|
| DE | 19836196 A1 | 2/1999 |
| DE | 19943373 A1 | 3/2000 |
| DE | 102004002403 B3 | 7/2005 |
| FR | 997233 | 9/1951 |
| JP | 2007317403 A | 12/2007 |
| WO | 2010060370 A1 | 6/2010 |

OTHER PUBLICATIONS

International Search Report and Written Opinion for corresponding Application No. PCT/US2012/036559, mailed Aug. 6, 2012, 9 pages.
International Preliminary Report for corresponding Application No. PCT/US2012/036559, mailed Apr. 10, 2014, 7 pages.
German Office Action for corresponding Application No. 11 2012 001 981.4, mailed May 12, 2015, 8 pages.

* cited by examiner

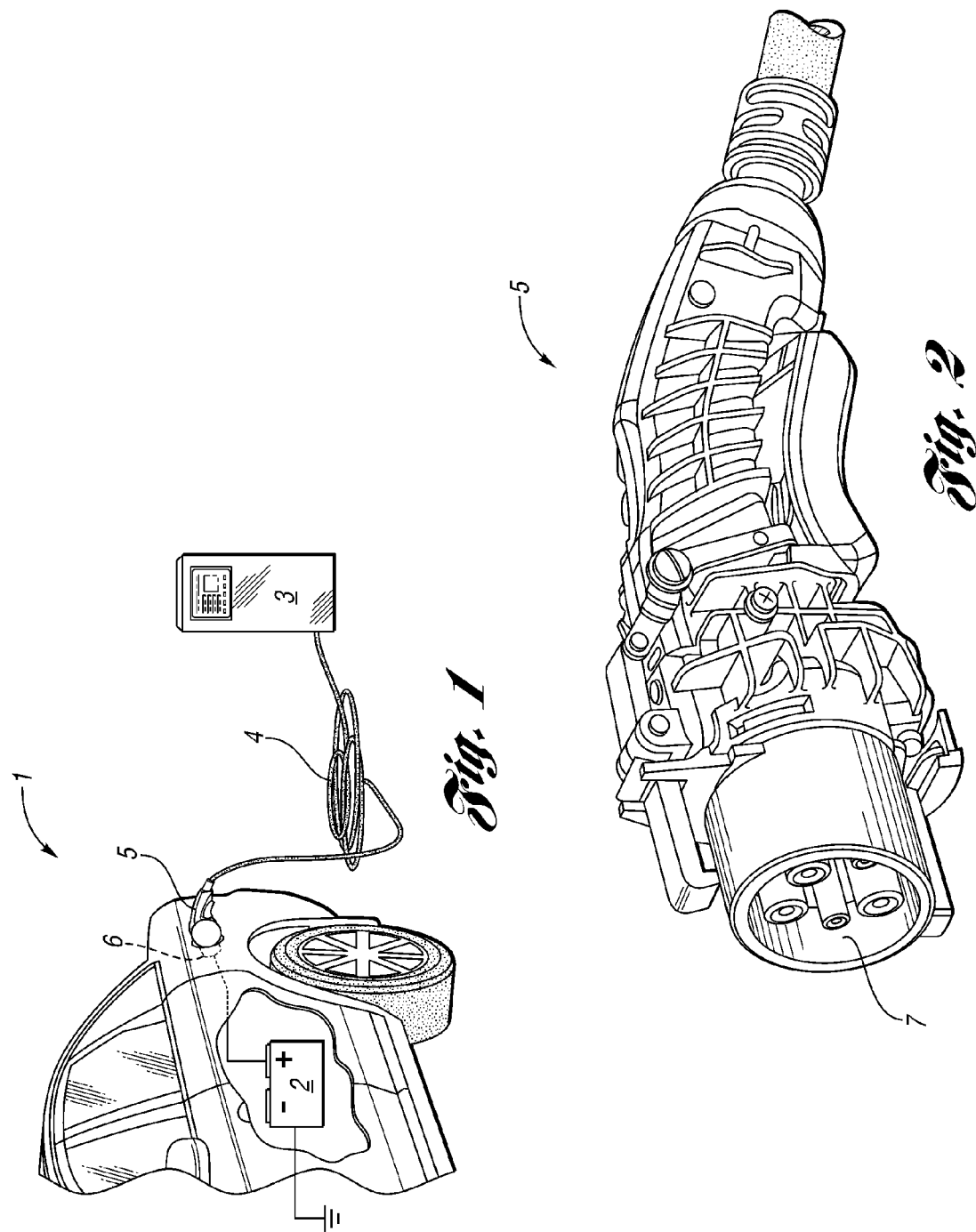

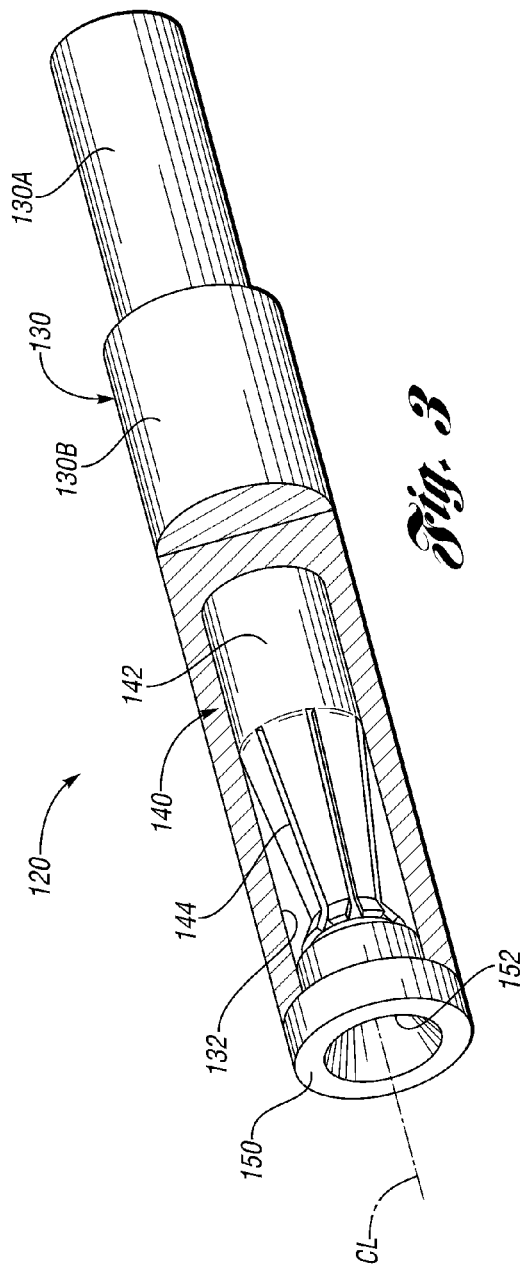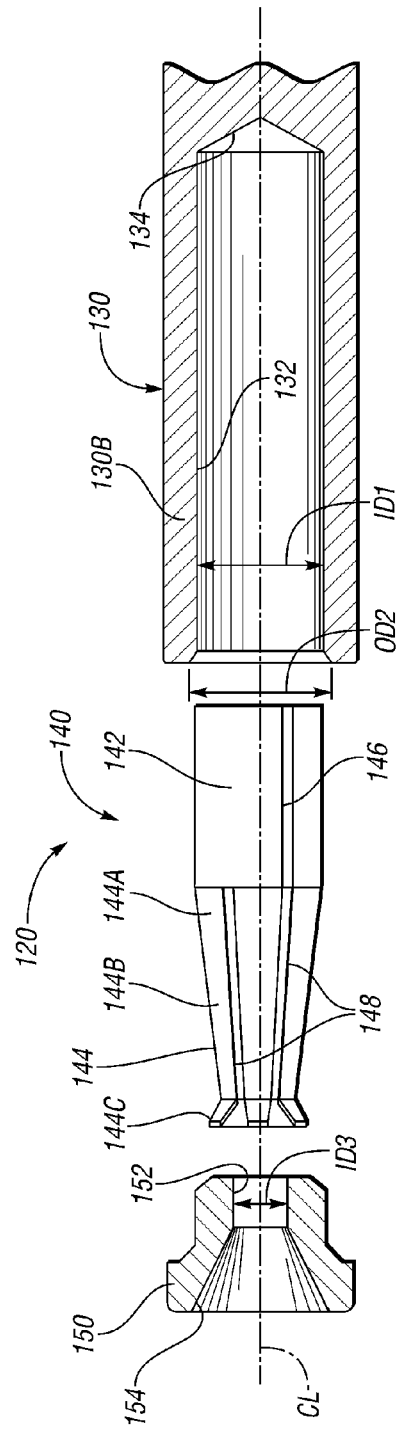

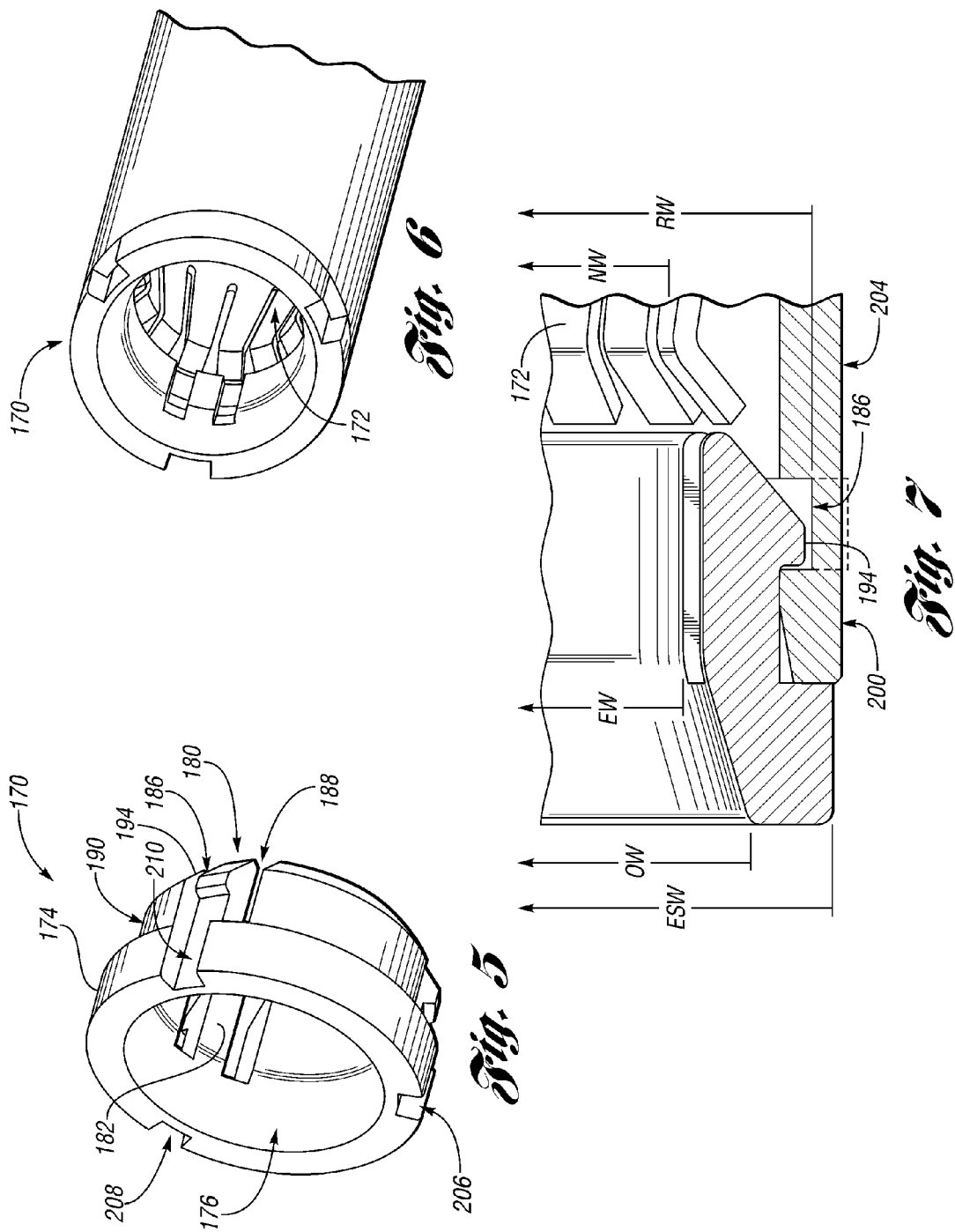

ELECTRICALLY CONDUCTING TERMINAL

CROSS-REFERENCE TO RELATED APPLICATIONS

This application is a continuation of U.S. application Ser. No. 13/214,376 filed Aug. 22, 2011, now U.S. Pat. No. 8,840,436, which is a continuation-in-part of U.S. application Ser. No. 13/101,592 filed May 5, 2011, now U.S. Pat. No. 8,876,562, the disclosures of which are hereby incorporated in their entirety by reference herein.

TECHNICAL FIELD

The present invention relates to electrical terminals, such as but not limited to terminals of the type having a resilient element operable to facilitate electrical connectivity between the terminal and an electrical connector.

BACKGROUND

Electrical terminals are used in a number of applications to facilitate electrical connecting one element to another. Some electrical terminals may be configured to facilitate use with a removable connector of the tape that may be repeatedly inserted and removed or otherwise configured to repeatedly engage and disengage the electrical terminal. The ability of the electrical terminal to facilitate electrical connectivity with such a removable connector can be problematic if an electrical connection area between the terminal and connector has poor connectivity, particularly when tolerance variations or degradation from repeated use causes a mating arrangement between the components to become loose or otherwise insecure.

SUMMARY

One non-limiting aspect of the present invention contemplates an electrical terminal configured to electrically connect to a connector, the terminal comprising: an electrically conducting body having a recessed end, the recessed end having a first portion with a first width; a resilient conducting element positioned within the first recessed end, the conducting element having a first opening with a second width to provide an interference fit with the connector; and an end cap positioned within the first recessed end outboard of the resilient conducting element to secure the resilient conducting element within the recessed end.

One non-limiting aspect of the present invention contemplates the first width is greater than the second width and the second width is less than a width of the connector.

One non-limiting aspect of the present invention contemplates the end cap is comprised of a conducting material and welded to the recessed end.

One non-limiting aspect of the present invention contemplates the end cap is comprised of a non-conducting material.

One non-limiting aspect of the present invention contemplates the end cap includes a resilient snap finger, the resilient snap finger interlocking with a channel of the connector to secure the end cap within the recessed end.

One non-limiting aspect of the present invention contemplates the end cap is comprised of a non-conducting material.

One non-limiting aspect of the present invention contemplates the channel is at an exterior portion of the connector.

One non-limiting aspect of the present invention contemplates the channel is at an interior portion of the connector.

One non-limiting aspect of the present invention contemplates the end cap has a second opening with a third width to provide an interference fit with the connector, the connector passing through the second opening to be received within the first opening.

One non-limiting aspect of the present invention contemplates the third width is approximately equal to a width of the connector and wherein the third width is greater than the second width.

One non-limiting aspect of the present invention contemplates the first width is greater than the third width.

One non-limiting aspect of the present invention contemplates the resilient element is a female type contact having a body portion and a plurality of flexible beams that extend from the body portion, wherein the flexible beams include a base portion having a width approximately equal to the first width when inserted in the recessed end and a tip portion having a width that is smaller than the width of the base portion.

One non-limiting aspect of the present invention contemplates an electrically conducting terminal comprising: an electrically conducting body having a recessed end; a resilient conducting element positioned within the first recessed end; and an end cap positioned within the first recessed end outboard of the resilient conducting element to prevent removal of the resilient conducting element.

One non-limiting aspect of the present invention contemplates the end cap is comprised solely of a conducting material.

One non-limiting aspect of the present invention contemplates the end cap is comprised solely of a non-conducting material.

One non-limiting aspect of the present invention contemplates the end cap includes a snap finger that flexes inwardly during insertion of the end cap into the recessed end, and thereafter, flexes outwardly to retain a finger within a channel of the recessed end.

One non-limiting aspect of the present invention contemplates the end cap includes a first portion having a width greater than an interior width of a beginning portion of the recessed end; a second portion having a width approximately equal to the interior width of the beginning portion of the recessed end; an opening through the first portion and the second portion; and wherein a width of the snap finger proximate the second portion is greater than the width of the second portion and less than the width of the first portion.

One non-limiting aspect of the present invention contemplates the first portion includes a recess rearward of the snap finger, the channel having a width approximately equal to the width of the second portion.

One non-limiting aspect of the present invention contemplates an electrical conducting terminal comprising: an electrically conducting body having a recessed end; a resilient conducting element positioned within the first recessed end; and an snap-fit end cap positioned within the first recessed end outboard of the resilient conducting element to prevent removal of the resilient conducting element, the snap-fit end cap including a snap finger that flexes in a first direction during insertion of the snap-fit end cap into the recessed end, and thereafter, flexes in a second direction to be retained within a channel of electrically conducting body, thereby securing the snap-fit end cap outboard of the resilient conducting element to prevent the resilient conducting element from being removed without removal of the snap-fit end.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a charging system as contemplated by one non-limiting aspect of the present invention.

FIG. 2 illustrates a charging connector as contemplated by one non-limiting aspect of the present invention.

FIGS. 3-4 illustrate a terminal having a resilient element configured as a female contact in accordance with one non-limiting aspect of the present invention.

FIGS. 5-7 illustrate a snap-fit end cap as contemplated by one non-limiting aspect of the present invention.

DETAILED DESCRIPTION

Figure 10:
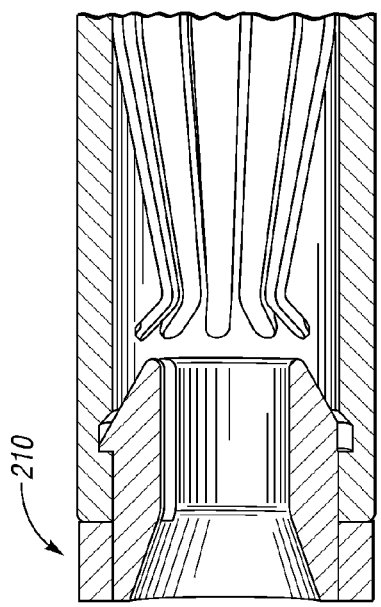
FIGS. 8-10 illustrate a snap-fit end cap as contemplated by one non-limiting aspect of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

FIG. 1 illustrates a charging system 1 operable to facilitate charging a vehicle charging system 2 with energy provided from a wall outlet or charging station 3 as contemplated by one non-limiting aspect of the present invention. The system 1 may include a cordset 4 having plurality of conducting wires and/or other conducting elements to facilitate delivering current between the charging station 3 and the vehicle charging system 2. One end of the cordset 4 may include a connector assembly 5 configured to be received within a charging receptacle 6 associated with the vehicle charging system. The connector assembly 5 may be of the type described in U.S. Pat. No. 7,878,866, the disclosure of which is hereby incorporated by reference in its entirety by reference.

The charging receptacle 6 may be configured to facilitate establishment of an electrical connection between a plurality of electrically conducting elements of the vehicle charging system 2 and the charging station 3. The charging receptacle 6 may facilitate the desired electrical connection by providing interconnecting conducting elements and/or by guiding the vehicle charging system and cordset conducting elements into a mating arrangement with each other. The charging receptacle 6 may be configured to support a multiple pin or port connection methodology for facilitating electrically interconnecting the vehicle charging system and cordset conducting elements, including but not limited to that specified in Society of Automotive Engineer (SAE) J1772 and International Electrotechnical Commission (IEC) 51851.

FIG. 2 illustrates the charging connector 7 as contemplated by one non-limiting aspect of the present invention. The illustrated charging connector 7 may be configured to facilitate electrically interconnecting vehicle charging system conducting elements with cordset conducting elements by guiding the elements into engagement with each other. The charging connector 22 may include an electrically conducting terminal 30. The terminal 7 may be configured to facilitate interconnecting pins of the receptacle 6 with wires included within the cordset 4.

FIGS. 3-4 illustrate the terminal 120 as contemplated by one non-limiting aspect of the present invention. As shown therein, the illustrated female type electrical connector 120 includes a housing, indicated generally at 130, that is generally hollow and cylindrical in shape. However, the housing 130 may have any desired shape. The housing 130 can be formed from any desired material, but preferably is formed from a material that is relatively rigid and electrically conductive. If desired, an outer layer of an electrically non-conductive material (not shown) may be provided about the housing 130. The illustrated housing 130 includes a first portion 130A and a second portion 130B, the purposes of which will be explained below. The first portion 130A and the second portion 130B can be integrally formed from a single piece of material as shown, but may alternatively be formed from two or more separate pieces material that are secured together. The illustrated first and second portions 130A and 130B of the housing 130 are co-axially aligned along a centerline CL, but may be non-aligned if desired.

The first portion 130A of the housing 130 is adapted to electrically connect the female type electrical connector 120 to the source of electrical energy. For example, the first portion 130A may define an aperture (not shown) that extends into an end portion thereof. The aperture can be adapted to receive a lead wire (not shown) that is connected the source of electrical energy. The lead wire may be secured within the aperture by a soldering, crimping, or other process. Alternatively, the first portion 130A of the female type electrical connector 120 can be connected to the source of electrical energy using a mechanical electrical connector or any other fastener arrangement if so desired. The first portion 130A may define any other structural features for a desired purpose.

The second portion 130B of the housing is configured to receive and frictionally engage the male type electrical connector. To accomplish this, the second portion 130B can be formed having a bore 132 that extends any length into an end portion thereof. Thus, the illustrated second portion 130B defines an open end where the bore 132 is provided and a closed end defined by a back wall 134. Further, it should be appreciated that the cylindrical wall of the second portion 130B may be any thickness for a desired application. The second portion 130B will be further described below.

The illustrated female type electrical connector 120 also includes a female type contact or electrical terminal, indicated generally at 140, that is disposed within the bore 132. The female type contact 140 is a hollow, cylindrical structure that includes a body portion 142 and having a plurality of flexible beams 144 extending therefrom. As shown, an outer cylindrical surface of the body portion 142 is adapted to frictionally engage an inner cylindrical wall of the bore 132 of the second portion 130B. Engagement between the body portion 142 and the second portion 130B secures the female type contact 140 within the bore 132 and establishes electrical continuity between the female type contact 140 and the housing 130. Insertion of the female type contact 140 within the second portion 130B will be further explained below. Alternative ways of securing the female type contact 140 within the second portion 130B will also be described and illustrated below.

The illustrated female type electrical connector 120 also includes an optional end piece 150. The end piece 150 can be secured to the open end of the second portion 130B. The illustrated end piece 150 has a through hole 152 formed therethrough. The end piece 150 can be formed from any desired material, but preferably is formed from an electrically non-conductive material such as plastic or the like. The purpose of the end piece 150 will be described in further detail below.

FIG. 4 shows the components of the female type electrical connector 120 prior to assembly. As described above, the bore 132 is formed in the second portion 130B of the housing 130 so as to define an open end. If desired, a chamfer can be provided around the outer edge of the open end, although such is not required. The back wall 134 can be a generally flat surface or may define a conical shape that is formed by a cutting tool (not shown) used to machine the bore 132. The bore 132 has an inner diameter ID1 that is configured to receive the female type contact 140 in the manner explained below. It should be appreciated that the bore 132 can be any size and/or shape for a desired application. The illustrated female type contact 140 can be produced from a sheet of resiliently flexible material that is cut and subsequently shaped to form the cylindrical body portion 142 and the flexible beams 144, as will be further explained below. In doing so, opposite edges of the sheet are brought together in an opposing fashion to form a gap 146. The gap 146 axially extends along an entire length of the body portion 142, although such is not required. The circumferential width of the gap 146 can be selectively adjusted by flexing a cross section of the body portion 142 from a relaxed or biased position to a flexed position. As such, the body portion 142 can be adjustable to provide a desired outer diameter OD2 of the body portion 142. The relaxed outer diameter OD2 of the body portion 142 is slightly larger than the inner diameter ID1 of the bore 132 prior to the female type contact 140 being inserted into the bore 132. The gap 146 enables the outer diameter OD2 of the body portion 142 to be temporarily reduced to facilitate the insertion of the female type contact 140 into the bore 132.

FIGS. 5-7 illustrates an interior connecting snap-fit end cap 170 operable to be added to one of the terminals 12, 120 noted above or other similarly recessed terminals in accordance with one non-limiting aspect of the present invention. The end cap 170 may be configured to be positioned outboard of a resilient element 172 (shown as the female contact 140). Optionally, the end cap 170 may be configured to have a length sufficient to pre-load the resilient element such that it is at least partially compressed to the resilient element 172 toward a rearward wall of the recessed end 132, which may be beneficial to protecting the contact beams and compensating for manufacturing tolerances. The end cap 170 may be configured to prevent removal of the resilient element 172 from a recessed end. The end cap 170 may include an end stop 174 having a width ESW slightly larger than an outer width ID1 of the recessed end 132 in order to control how far the end cap 170 is able to insert. The end cap 170 includes an opening 176 to permit passage of a connector (not shown). The opening 176 may include a slightly larger width OW at a beginning portion and then taper down thereafter to a width EW approximately equal to the width of the connector. The width EW may be selected to provide an interference fit with the connector, although it is not necessary that an interference fit be provided as the end cap 170 may be used simply to guide the connector into the resilient element/recessed end 132. Optionally, a narrowest width NW of the resilient element 146 at the tip portion 144C may be selected to be slightly smaller than the width EW of the opening 176 and/or the connector in order to insure a sufficient electrical connection between the resilient element 140 and the connector. The exterior width ESW of the end stop 174 may be size to correspond with an exterior width of the terminal 130 in order to provide a flush exterior surface.

The snap-fit end cap 170 may be comprised of a conducting or non-conducting material, such as but not limited to plastic or rubber. The material may be selected to be of a type sufficient to facilitate use of a plurality of snap fingers 180, 182, 184. The snap fingers 180, 182, 184 may be defined by channels 186, 188 (only shown for finger 180) included within an inserted portion 190 of the end cap 170. The end of the snap fingers 180, 182, 184 may be shaped into a finger 194. The finger 194 may snap into a corresponding recessed channel 196 of the recessed end 132. The recessed channel 194 may include a width RW slightly larger than the width ID1 of the recessed end 132 at an outer portion 200 and a width ID1 of the recessed end at an inner portion 204. While the width ID1 of the recessed end 132 at the outer portion 200 is shown to be equal to the width ID1 of the inner portion 204, it may be larger or smaller depending on design consideration of the end cap 170, e.g., the width of the outer portion 200 may be larger than the inner portion 204 in the event the material characteristics of the end cap 170 require more material to facilitate the contemplated flexing of the snap finger 186, which may be required in the event the recessed end is relatively narrow.

Figure 8:
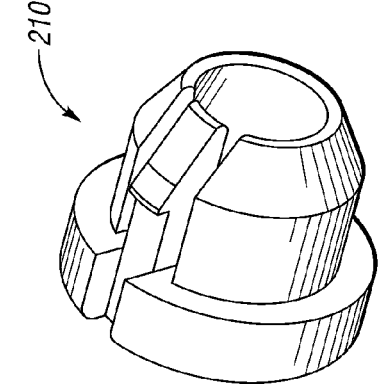
Figure 9:
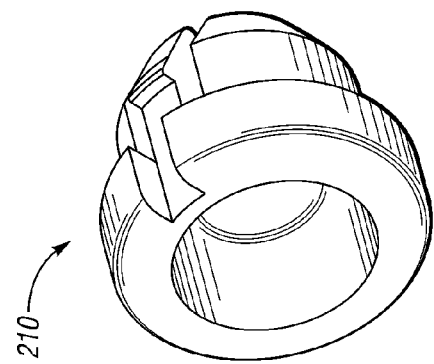

A recess 206, 208, 210 may be included rearward of a tip of each finger to facilitate molding of the end cap 170. The recesses 206, 208, 210 may be sized to approximate the height of the tip so that the end cap 170 can be laterally removed from a molding tool without having to open the tool. This may be beneficial in limiting tooling cost and associated manufacturing cost. Of course, the present invention is not necessarily limited to this configuration and fully contemplates molding at least the end stop portion 174 without the recesses 206, 208, 210 so that a continuous ring of material can be provided. The snap-fit end cap 170 is shown to include three snap fingers 180, 182, 184 equal distantly spaced about the inserted portion 190. FIGS. 8-10 illustrate an alternative embodiment of a snap-fit end cap 210 where a single snap finger is included. The use of the single snap finger configuration may be beneficial with narrower connectors and/or terminals where it may not be possible to maintain the structural integrity of the end cap while permitting the use of multiple snap fingers.

Figure 12:
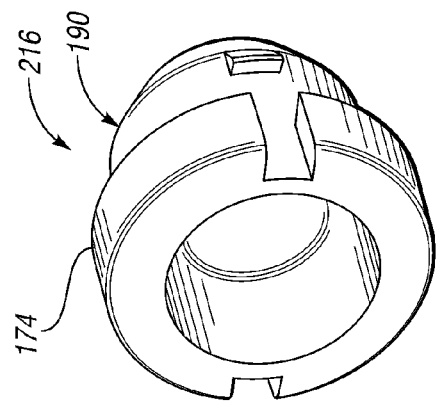
FIGS. 11-12 illustrate a snap-fit end cap as contemplated by one non-limiting aspect of the present invention.
Figure 11:
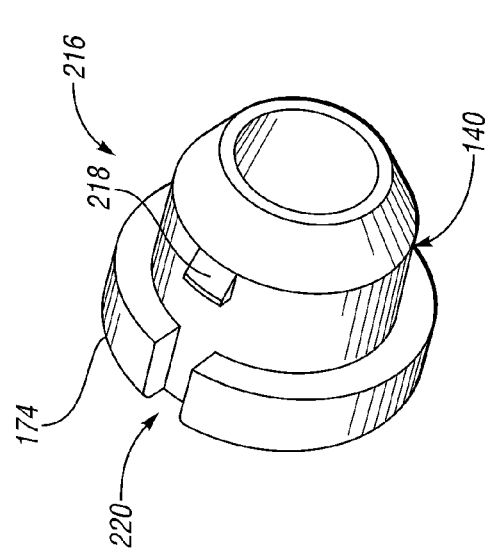
Figure 14:
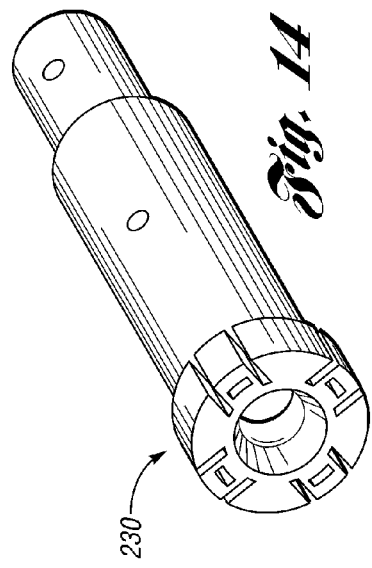
FIGS. 13-16 illustrate a snap-fit end cap as contemplated by one non-limiting aspect of the present invention.
Figure 16:
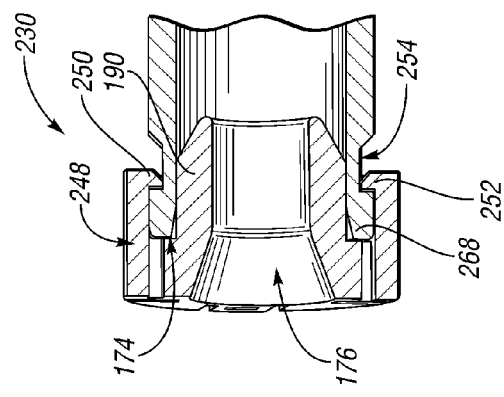
Figure 13:
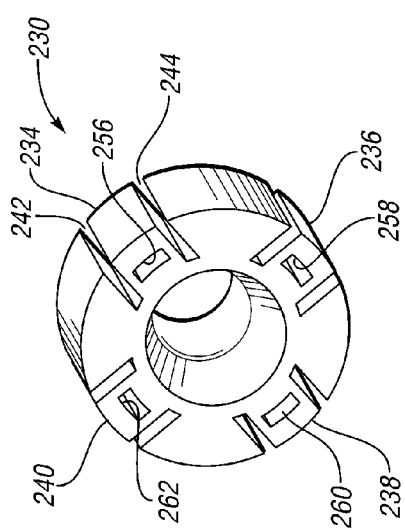
Figure 15:
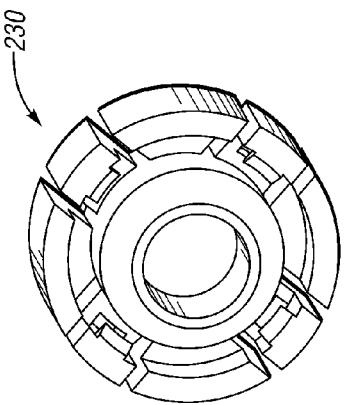

Optionally, instead of defining the snap fingers with channels through the inserted portion of the end cap, the channels may be removed. FIGS. 11-12 illustrate an alternative embodiment of a snap-fit end cap 216 similarly configured to the end cap 170 except for having channels 186, 188 removed. In this configuration, a finger tip 218 instead extends outwardly from the inserted portion 190 to facilitate the snap fit. This configuration may require the size and shape of the end cap 216 and/or its material composition to allow some flexing or bending during insertion so that the finger tip 218 can compress within the outer portion 200 of the inner recess 132, and thereafter, decompress to be retained within the channel 194. As with the configuration shown in FIGS. 5-7, an area 220 behind the finger tip 218 is shown to be removed to form recesses within the end stop portion 174 in order to facilitate removal from a mold tool. Of course, like the other embodiments, this material may not necessarily be removed. The embodiment shown in FIGS. 13-14 includes two fingers 218 to demonstrate the present invention contemplating the end cap including one, two, three or some other number of snap fingers.

FIGS. 13-16 illustrates an exterior connecting snap-fit end cap 230 in accordance with one non-limiting aspect of the present invention. The end cap 230 may be similarly configured to the end caps 170, 210, 216 shown above with respect to having an end stop portion 174 and an inserted portion 190. The opening 176 extends through the end stop 174 and inserted portions 190 to facilitate guiding the connector into the resilient element (not shown). The opening 176 may be size to provide a tapered opening that narrows to more closely align with the connector. The end cap 230, unlike the end caps 170, 210, 216 described above, may include a plurality of snap fingers 234, 236, 238, 240 defined by corresponding channels 242, 244 (only one channel set is labeled) within an overlapping portion 248 extending beyond the end stop portion 174. The snap fingers 234, 236, 238, 240 are shown to include fingers 250, 252 that have a tip retained within a channel 254 included on an exterior portion of the terminal 130. The configuring of the snap fingers 234, 236, 238, 240 to engage an exterior portion of the connector 130 may be beneficial in facilitating removal of the end cap 230 without having to use a tool, i.e., the tool may be required to remove the interior connecting end caps.

Reliefs 256, 258, 260, 262 may be included in the overlapping portion 248 rearwardly of the tips 250, 252 of the fingers 234, 236, 238, 240. The reliefs 256, 258, 260, 262 may be provided to facilitate removal of the end cap 230 from a molding tool without having to open the molding tool, similar to the inclusion of the channels rearward of the tips of the fingers shown above. The terminal shown in FIG. 16 includes a chamfered leading edge 268 that cooperates with a correspondingly chamfered leading edge 270 of the interior portion of the end cap. These chamfered edges 268, 270 may be helpful facilitating insertion of the end cap 230 within the recessed end of the terminal 130. The end cap 230 is shown to include four equally spaced snap fingers 234, 236, 238, 240, however, the end cap 230 may include any number of snap fingers 234, 236, 238, 240 without deviating from the scope and the contemplation of the present invention. The end cap 230 may be comprised of a suitable conducting or non-conducting material.

Figure 17:
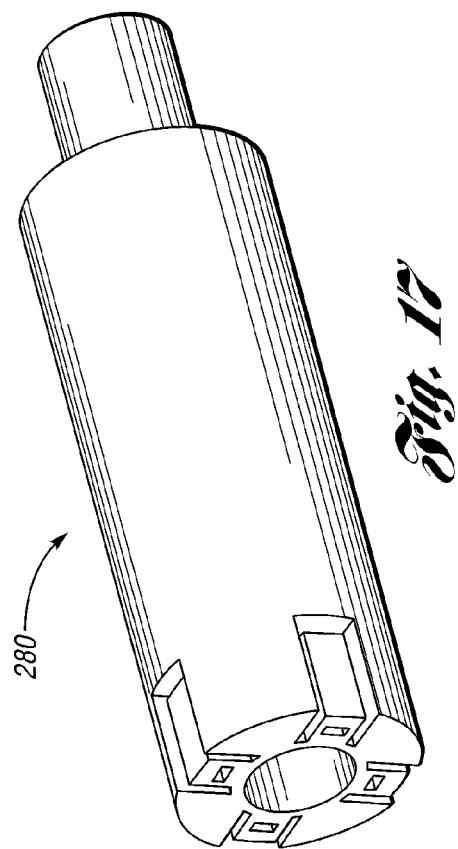
FIGS. 17-18 illustrate a snap-fit end cap as contemplated by one non-limiting aspect of the present invention.
Figure 18:
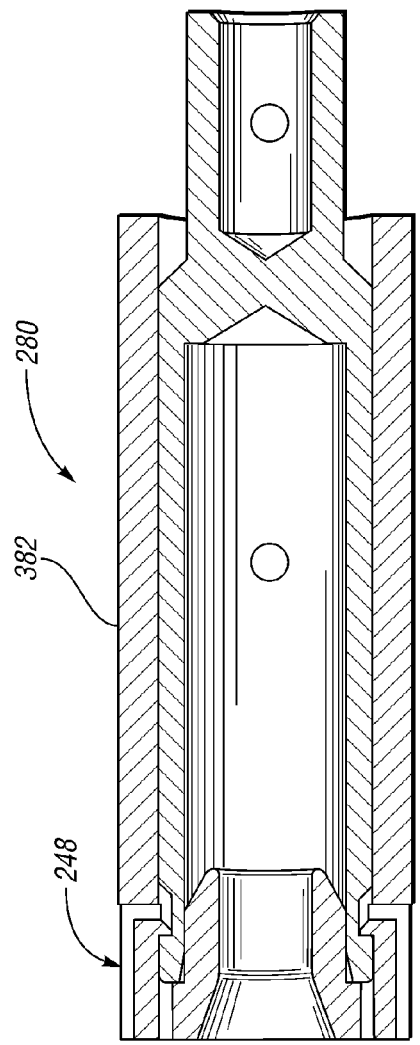

The end cap shown in FIGS. 13-16 includes the overlapping portion 248 extending a slight distance over the connector 130. FIGS. 17-18 illustrate an end cap 280 where an overlapping portion 382, similar to the overlapping portion 248 shown in FIGS. 15-18, extends approximately the entire length of the first recessed end 12 and to an area proximate the second recessed 14 end to form a sleeve/housing. This sleeve-type of end cap 280 may be integrated within a receptacle of the connector assembly 5 where multiple terminals are inserted into the receptacle to create electrical contacts for receiving the vehicle charging system 6, i.e., one of the connector 7. Of course, the present invention is not so limited and fully contemplates the sleeve-type of end cap being a standalone feature added to the terminal instead of being included as part of an assembled housing or other receptacle.

As supported above, the present invention contemplates various end cap configurations to facilitate insulating an end of an electrically conducting terminal and/or to facilitate lowering an insertion force for a pin entering the electrically conducting terminal. The insulating contemplated by the present invention may be beneficial in preventing arcing between an inserting connector and a terminal having the insulating end cap. The use of the insulating end cap may also be beneficial in controlling when an electrical connection is established between the terminal and then inserting connector. The dictation of the electrical connection can be important when used with the noted vehicle charging assembly or other assemblies where multiple pins may be received within multiple terminals and their existing need to dictate an order in which the pins are able to establish a corresponding electrical connections, i.e., it may be beneficial have one pin electrically connect prior to one or more of the other pins.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical terminal comprising:
   an electrically conductive body having a recessed end, the recessed end having a first portion with a first width;
   a resilient conductive element positioned within the recessed end, the conductive element having a first opening with a second width to provide an interference fit with a connector; and
   an end cap positioned within the recessed end outboard of the resilient conductive element to secure the resilient conductive element within the recessed end;
   wherein the end cap has a second opening sized to receive the connector through the second opening into the first opening;
   wherein the end cap pre-loads the resilient conductive element to at least partially compress the resilient conductive element between the end cap and a rearward wall of the recessed end; and
   wherein the resilient element is a female type contact having a body portion and a plurality of flexible beams that extend from the body portion, wherein the flexible beams include a base portion having a width approximately equal to the first width when inserted in the recessed end and a tip portion having a width that is smaller than the width of the base portion.

2. The electrical terminal of claim 1 wherein the first width is greater than the second width and the second width is less than a width of the connector.

3. The electrical terminal of claim 1 wherein the end cap is comprised of a conductive material and welded to the recessed end.

4. The electrical terminal of claim 1 wherein the second opening has a third width sized to provide an interference fit with the connector.

5. The electrical terminal of claim 1 wherein the end cap includes a resilient snap finger, the resilient snap finger interlocking with a channel of the electrically conductive body to secure the end cap within the recessed end.

6. The electrical terminal of claim 5 wherein the end cap is comprised of an insulation material.

7. The electrical terminal of claim 5 wherein the channel is at an exterior portion of the electrically conductive body.

8. The electrical terminal of claim 5 wherein the channel is at an interior portion of the electrically conductive body.

9. The electrical terminal of claim 1 wherein the second opening has a third width that is approximately equal to a width of the connector and wherein the third width is greater than the second width.

10. The electrical terminal of claim 9 wherein the first width is greater than the third width.

11. An electrically conductive terminal comprising:
    an electrically conductive body having a recessed end having a first portion with a first width;
    a resilient conductive element positioned within the recessed end, the conductive element having a first opening with a second width sized to provide an interference fit with a connector; and an end cap positioned within the recessed end outboard of the resilient conductive element to prevent removal of the resilient conductive element;

wherein the end cap has a second opening sized to receive the connector through the second opening into the first opening;

wherein the second opening has a third width sized smaller than the connector to provide an interference fit with the connector; and wherein the end cap is comprised solely of an insulation material.

12. The electrical conductive terminal of claim 11 wherein the end cap includes a snap finger that flexes inwardly during insertion of the end cap into the recessed end, and thereafter, flexes outwardly to retain a finger within a channel of the recessed end.

13. The electrical conductive terminal of claim 12 wherein the end cap comprises:

a first portion having a width greater than an interior width of a beginning portion of the recessed end; and a second portion having a width approximately equal to the interior width of the beginning portion of the recessed end;

wherein the second opening extends through the first portion and the second portion; and wherein a width of the snap finger proximate the second portion is greater than the width of the second portion and less than the width of the first portion.

14. The electrical conductive terminal of claim 13 wherein the first portion includes a recess rearward of the snap finger, the channel having a width approximately equal to the width of the second portion.

15. An electrical terminal comprising:

an electrically conductive body having a recessed end, the recessed end having a first portion with a first width;

a resilient conductive element positioned within the recessed end, the conductive element having a first opening with a second width to provide an interference fit with a connector; and an end cap positioned within the recessed end outboard of the resilient conductive element to secure the resilient conductive element within the recessed end;

wherein the end cap has a second opening sized to receive the connector through the second opening into the first opening;

wherein the end cap pre-loads the resilient conductive element to at least partially compress the resilient conductive element between the end cap and a rearward wall of the recessed end; and wherein the end cap includes a resilient snap finger, the resilient snap finger interlocking with a channel of the electrically conductive body to secure the end cap within the recessed end.

16. The electrical terminal of claim 15 wherein the end cap is comprised of an insulation material.

17. The electrical terminal of claim 15 wherein the channel is at an exterior portion of the electrically conductive body.

18. The electrical terminal of claim 15 wherein the channel is at an interior portion of the electrically conductive body.

* * * * *